(12) United States Patent
Kunimochi et al.

(10) Patent No.: US 8,118,465 B2
(45) Date of Patent: Feb. 21, 2012

(54) SPREAD ILLUMINATING APPARATUS

(75) Inventors: Toru Kunimochi, Nagano (JP); Ryohei Takayama, Nagano (JP); Akiko Suma, Nagano (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 12/884,280

(22) Filed: Sep. 17, 2010

(65) Prior Publication Data

US 2011/0103091 A1   May 5, 2011

(30) Foreign Application Priority Data

Oct. 30, 2009  (JP) ................................. 2009-249625
Oct. 30, 2009  (JP) ................................. 2009-249626

(51) Int. Cl.
 *F21V 8/00* (2006.01)
(52) U.S. Cl. ......... 362/612; 362/613; 362/615; 362/628
(58) Field of Classification Search .................. 362/612, 362/613, 621, 615, 628
See application file for complete search history.

(56) References Cited

U.S. PATENT DOCUMENTS

| 7,188,989 B2* | 3/2007 | Miyashita | 362/621 |
| 7,697,813 B2* | 4/2010 | Lee et al. | 385/146 |
| 7,808,576 B2* | 10/2010 | Takahashi et al. | 349/65 |
| 2009/0135627 A1* | 5/2009 | Furuyama et al. | 362/621 |

FOREIGN PATENT DOCUMENTS

| JP | 2005-259374 A | 9/2005 |
| JP | 2007-287550 A | 11/2007 |

* cited by examiner

*Primary Examiner* — Laura Tso
(74) *Attorney, Agent, or Firm* — Carrier Blackman & Associates, P.C.; Joseph P. Carrier; William D. Blackman

(57) ABSTRACT

There is provided a spread illuminating apparatus including an LED, a light guide plate and a flexible printed circuit board on which the LED is mounted, wherein the light guide plate includes: a light entrance end surface at which the light source is disposed; a light emitting portion from which light emitted from the light source and introduced into the light guide plate exits out in a spread manner; a slope portion which is disposed between the light entrance end surface and the light emitting portion and which has a thickness decreasing toward the light emitting portion; and a seat block disposed at the slope portion and configured to fixedly receive the flexible printed circuit board. In the spread illuminating apparatus, the length of the slope portion is substantially 1.78 times as large as the largest thickness of the slope portion.

9 Claims, 7 Drawing Sheets

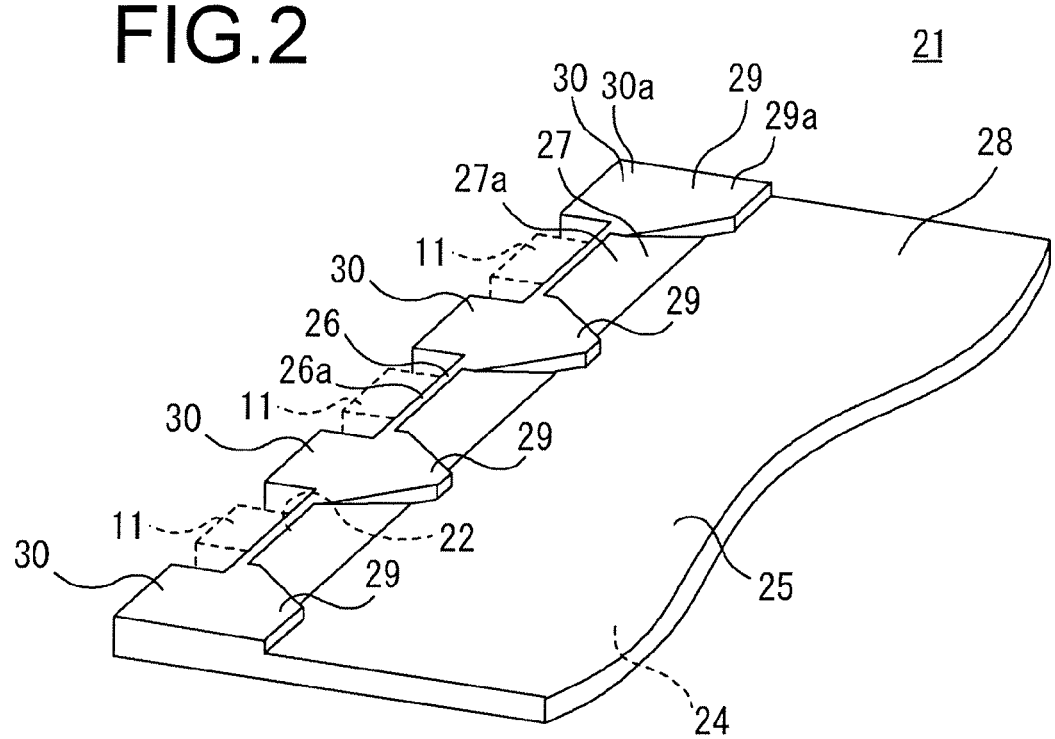

FIG.3A
FIG.3B
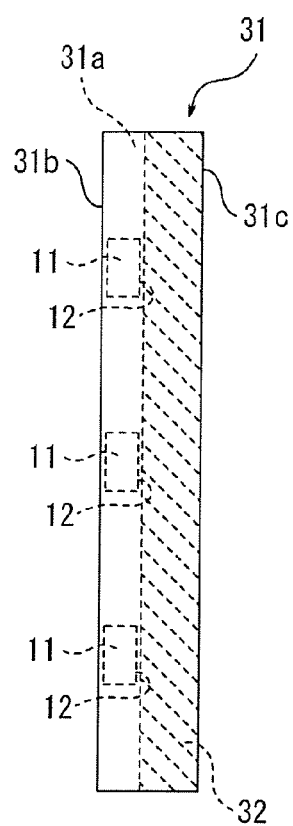
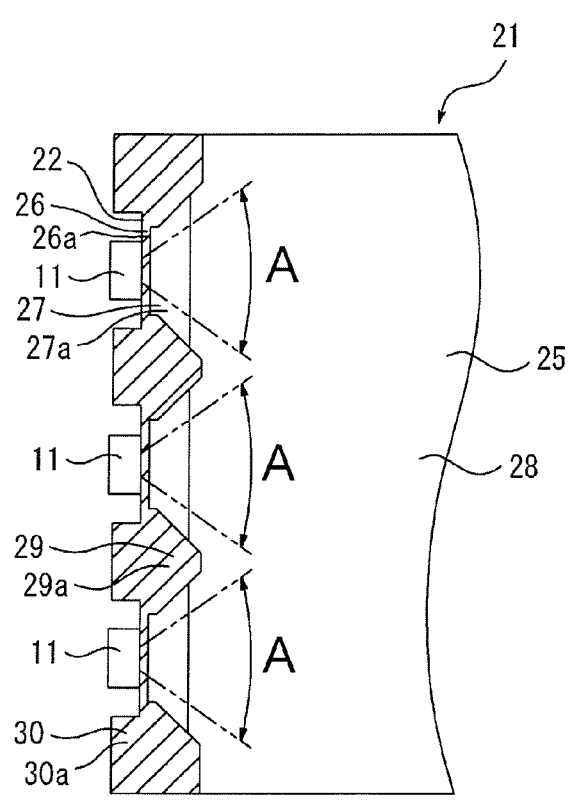

SPREAD ILLUMINATING APPARATUS

BACKGROUND OF THE INVENTION

1. Field of the Invention

The present invention relates to a spread illuminating apparatus of side light type including a light guide plate, wherein a light source is disposed at a light entrance end surface of the light guide plate and light for illumination is emitted from a light emitting portion of the light guide plate in a spread manner, and relates more particularly to a spread illuminating apparatus including a light guide plate having a slope portion which is disposed toward the light entrance end surface and in which a thickness decreases gradually with an increase of distance from the light entrance end surface.

2. Description of the Related Art

A spread illuminating apparatus of side light type (back light), in which a plurality of LEDs (light emitting diodes) having a small dimension and excellent environmental compatibility are disposed along a light entrance end surface of a light guide plate, is widely used as an illuminating means for a liquid crystal display panel particularly in the field of small handheld terminals such as mobile phones. Recently, in order to meet the ever increasing demand for further reducing the thickness of small handheld terminals, a light guide plate is extensively employed that includes a slope portion disposed between the light entrance end surface and a light emitting portion from which light is emitted in a spread manner, wherein the slope portion has a thickness decreasing gradually with an increase of distance from the light entrance end surface (refer to, for example, Japanese Patent Application Laid-Open No. 2007-287550).

When a slope portion is formed at a portion of a light guide plate located close to a light entrance end surface as described above, the thickness of a light emitting portion of the light guide plate can be reduced regardless of the thickness of an LED. However, when the slope portion is disposed close to the light entrance end surface of the light guide plate as described above, some of light which enters the light guide plate from the light entrance end surface is easily allowed to leak from a slope surface of the slope portion. Also, since the light is reflected at the slope surface with a large directional change and thus is incident on an opposite surface at a small angle, much light is caused to exit from a part of the light emitting portion located close to the slope portion. Consequently, the utilization efficiency of light emitted from the LED is reduced and at the same time the brightness uniformity of illumination light emitted from the light emitting portion is deteriorated. Under the circumstances, a spread illuminating apparatus disclosed in Japanese Patent Application Laid-Open No. 2007-287550 includes a light guide plate in which an angle (refer to θ in FIG. 7B) formed between a light emitting surface and a slope portion is set at or below a prescribed value to thereby solve the problems.

Recently, in the effort to achieve a maximum liquid crystal display area, a spread illuminating apparatus is increasingly requested to have not only a lower profile but also a reduced non light emitting area (narrower picture frame) formed around a light emitting area. In order to satisfy the requests, since the slope portion cannot be utilized as a light emitting area for the spread illuminating apparatus, the dimension of the slope portion measured along the direction of light progression (length of the slope portion) must be minimized without allowing the amount of light leakage to increase. That is to say, the angle formed between the light emitting surface and the slope surface must be set at the largest possible value, which conflicts with the above disclosure that the angle formed between the light emitting surface and the slope surface is set at or below a prescribed value in order to improve the light utilization efficiency and also enhance the brightness uniformity of illumination light. Accordingly, it is necessary to develop a design concept that enables the non light emitting area to be minimized without allowing light loss to increase.

Also, the following problem is caused when the slope portion is provided toward the light entrance end surface of the light guide plate. Usually, LEDs are mounted on a strip-shaped circuit substrate and disposed to oppose the light entrance end surface of the light guide plate such that a part of the circuit substrate located forward of the mounted LED is fixedly attached to a part of the light emitting surface of the light guide plate located toward the light entrance end surface whereby the LEDs are fixed in position with respect to the light guide plate. This causes no problem when a slope portion is not formed toward the light entrance end surface of the light guide plate. Specifically, referring to FIG. 7A showing a light guide plate 103 having no slope portion provided toward a light entrance end surface 103a, when a circuit substrate 102 is fixedly attached to a light emitting surface 103b of the light guide plate 103, a light emitting face 101a of an LED 101 is set parallel to the light entrance end surface 103a of the light guide plate 103.

On the other hand, in the case where a light guide plate 113 includes an slope portion provided toward a light entrance end surface 113a as shown in FIG. 7B, when the above mentioned circuit substrate 102 is fixedly attached to a slope surface 113b of the slope portion of the light guide plate 113, the light emitting face 101a of the LED 101 cannot be set parallel to the light entrance end surface 113a of the light guide plate 113, because the light guide plate 113 is structured such that the light entrance end surface 113a is not orthogonal to the slope surface 113b. As a result, part (indicated by a dashed line with an arrowhead in FIG. 7B) of light emitted from the light emitting face 101a of the LED 101 leaks outside instead of being incident on the light entrance end surface 113a of the light guide plate 113, which lowers the brightness of illumination light emitted from a light emitting portion of the light guide plate 113.

Also, whether the circuit substrate 102 is fixedly attached to the part of the light emitting surface 103b located toward the light entrance end surface 103a (refer to FIG. 7A) or to the slope surface 113b (refer to FIG. 7B), light, which is incident on the part of the light emitting surface 103b located toward the light entrance end surface 103a or incident on the slope surface 113b, is absorbed by the circuit substrate 102 when it is reflected there, which also lowers the brightness of illumination light.

SUMMARY OF THE INVENTION

The present invention has been made in light of the problems described above, and it is a primary object of the present invention to provide a spread illuminating apparatus of side light type which has high brightness and excellent brightness uniformity of illumination light and at the same time which has a smallest possible non light emitting area.

The present inventors have made detailed investigations on the shape of the slope portion of the light guide plate in order to solve the problems described above, and have found a characteristic feature with criticality that the amount of light leakage is caused to rapidly increase when the length of the slope portion is below a predetermined value (threshold value) but does not vary much when the length of the slope portion exceeds the threshold value. Also, it has been found that if the dimension of the thickest part of the slope portion (corresponding to the dimension of the short side of the light entrance end surface of the light guide plate) is fixed, the threshold value stays substantially constant almost independent of the variation of the dimension of the thinnest part of the slope portion (corresponding to the thickness of the light emitting portion), and further it has been found out that the threshold value varies depending on the dimension of the thickest part of the slope portion and specifically has a linear relationship with the dimension of the thickest part of the slope portion. The present invention has been developed and accomplished on the basis of the foregoing findings.

In order to achieve the object described above, according to a first aspect of the present invention, there is provided a spread illuminating apparatus including a light source and a light guide plate, wherein the light guide plate includes: a light entrance end surface at which the light source is disposed; a light emitting portion from which light emitted from the light source and introduced into the light guide plate exits out in a spread manner; and a slope portion which is disposed between the light entrance end surface and the light emitting portion and which has a thickness decreasing toward the light emitting portion, wherein the length of the slope portion is substantially 1.78 times as large as the largest thickness of the slope portion.

With the above arrangement that the length of the slope portion is set substantially 1.78 times as large as the largest thickness of the slope portion, the non light emitting area can be minimized without allowing light leakage attributable to the slope portion to increase, that is to say, while maintaining high brightness and brightness uniformity of illumination light, about which detailed description will be made later.

In the first aspect of the present invention, the light source may be a point light source, mounted on a flexible printed circuit board and may include a first face (mount face) attached to the flexible printed circuit board and a second face (light emitting face) which is substantially orthogonal to the first face and from which light is emitted, and the light guide plate may further include a seat block which is disposed at the slope portion except an area of the slope portion located in the light progression direction of the light source, which includes a plane top orthogonal to the light entrance end surface and on which the flexible printed circuit board is disposed.

Since the seat block is disposed at the slope surface of the slope portion, the plane top of the seat block is substantially orthogonal to the light entrance end surface, and since the light emitting face of the point light source is substantially orthogonal to the mount face of the point light source, when the flexible printed circuit board is fixedly attached to the plane top of the seat block, the light emitting face of the light source is set parallel to the light entrance end surface of the light guide plate, which results in increasing the light coupling efficiency between the light source and light guide plate thus further increasing the brightness of illumination light. This advantageous effect can be efficiently achieved when the inclination angle of the slope surface (angle formed between the light emitting surface and the slope surface). Also, since the seat block is disposed at the slope portion except the area thereof located in the light progression direction of the point light source, there is a gap space between the flexible printed circuit board and the light guide plate (specifically the slope surface of the slop portion) in the light progression direction of the point light source thus preventing contact therebetween, which results in reducing light absorption by the flexible printed circuit board thus further increasing the brightness of illumination light.

In the first aspect of the present invention, a light absorbing member may disposed at a surface of the flexible printed circuit board facing the light guide plate.

Since the light absorbing member is attached to the flexible printed circuit board so a to cover the slope portion, even if some light leaks from the slope portion, the leakage light can be absorbed by the light absorbing member thereby further improving the brightness uniformity of illumination light.

In order to achieve the object described above, according to a second aspect of the present invention, there is provided a spread illuminating apparatus including a point light source mounted on a flexible printed circuit board and a light guide plate, wherein the light guide plate includes: a light entrance end surface at which the point light source is disposed; a light emitting portion from which light emitted from the light source and introduced into the light guide plate exits out in a spread manner; and a slope portion which is disposed between the light entrance end surface and the light emitting portion and which has a thickness decreasing toward the light emitting portion; and a seat block which is disposed at the slope portion except an area of the slope portion located in the light progression direction of the light source, and on which the flexible printed circuit board is disposed.

BRIEF DESCRIPTION OF THE DRAWINGS

FIG. 2 is a perspective view of a relevant portion of a light guide plate of the spread illuminating apparatus of FIG. 1;

FIG. 3A is a schematic plan view of an FPC of the spread illuminating apparatus, and FIG. 3B is a schematic plan view of a relevant portion of the light guide plate of the spread illuminating apparatus;

FIGS. 7A and 7B are schematic side views of relevant portions of conventional spread illuminating apparatuses, wherein FIG. 7A shows a light guide plate having no slope portion and FIG. 7B shows a light guide plate having a slope portion.

DETAILED DESCRIPTION OF THE INVENTION

Figure 1:
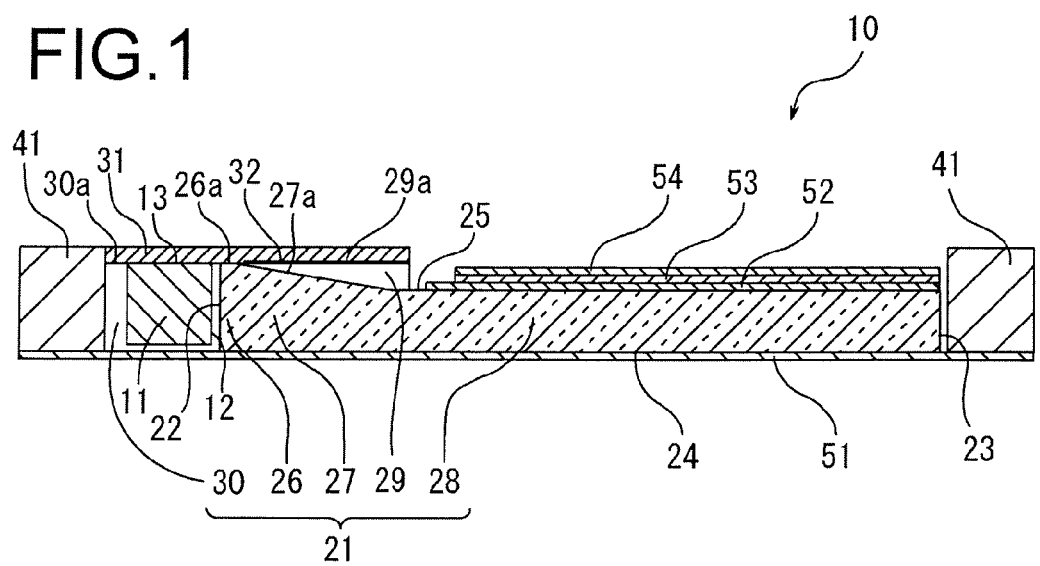
FIG. 1 is a cross sectional view of a spread illuminating apparatus according to an embodiment of the present invention.

An exemplary embodiment of the present invention will be described with reference to the accompanying drawings. For the purpose of convenience, the drawings may exaggerate the shapes of constituent components as appropriate and therefore may not accurately reflect their dimensions. FIG. 1 shows a spread illuminating apparatus 10 according to an embodiment of the present invention.

Referring to FIG. 1, the spread illuminating apparatus 10 includes a plurality of LEDs 11 as a light source (point light source), a light guide plate 21 configured to allow lights coming from the LEDs 11 to be emitted in a spread manner, an FPC (Flexible Printed Circuit Board) 31 having the LEDs 11 mounted thereon, and a frame 41 to enclose the LEDs 11 and the light guide plate 21.

In the present embodiment, each of the LEDs 11 is a pseudo white LED composed of a blue LED and a yellow fluorescent substance, has a rectangular body shape as a whole, and includes a side face functioning as a light emitting face 12 thus constituting a so-called side view type LED. The LEDs 11 each further includes a mount face 13 which makes contact with the FPC 31 when the LED 11 is mounted on the PFC 31 and which is substantially orthogonal to the light emitting face 12. In the present embodiment, as shown in FIG. 2, three LEDs 11 are arranged at predetermined intervals from one another along the long-side direction of a light entrance end surface 22 (to be described later) of the light guide plate 21 such that respective light emitting faces 12 oppose the light entrance end surface 22.

The light guide plate 21 is made of a transparent material (polycarbonate in the present embodiment) and has a rectangular shape in top plan view. The light guide plate 21 defines the aforementioned light entrance end surface 22, a distal end surface 23 disposed opposite to the light entrance end surface 22, a light reflecting surface 24 orthogonal to the light entrance end surface 22, and a light emitting surface 25 disposed parallel to the light reflecting surface 24. The light entrance end surface 22 has a short-side (thickness direction) dimension T1 (refer to FIG. 4) which is equal to or slightly larger than the same directional dimension of the light emitting face 12 of the LED 11. In the description of the present invention, the direction from the light entrance end surface 22 toward the distal end surface 23 (that is the direction of light progression) is defined as "forward direction".

Also, referring to FIG. 2, the light guide plate 21 integrally includes: a light entrance portion 26 formed to extend from the light entrance end surface 22 in the forward direction; a slope portion 27 extending from the light entrance portion 26 in the forward direction with its thickness gradually decreasing; a light emitting portion 28 which extends from the slope portion 27 in the forward direction and which is configured to allow light originated from the LED 11 and coming through the slope portion 27 to exit from the light emitting surface 25; a plurality (four in the present embodiment) of seat blocks 29 which are formed at an upper face (slope surface 27a to be described later) of the slope portion 27 communicating with the light emitting surface 25 and which are disposed separate from one another; and a plurality (four in the present embodiment) of protrusions 30 which are formed to extend out from the light entrance end surface 22 in the rearward direction and which are disposed separate from one another.

The light entrance portion 26 defines an upper surface 26a substantially orthogonal to the light entrance end surface 22 and has a constant thickness along the forward direction. The light entrance portion 26 is not essential to the present invention and may be omitted in terms of optical function.

Figure 4:
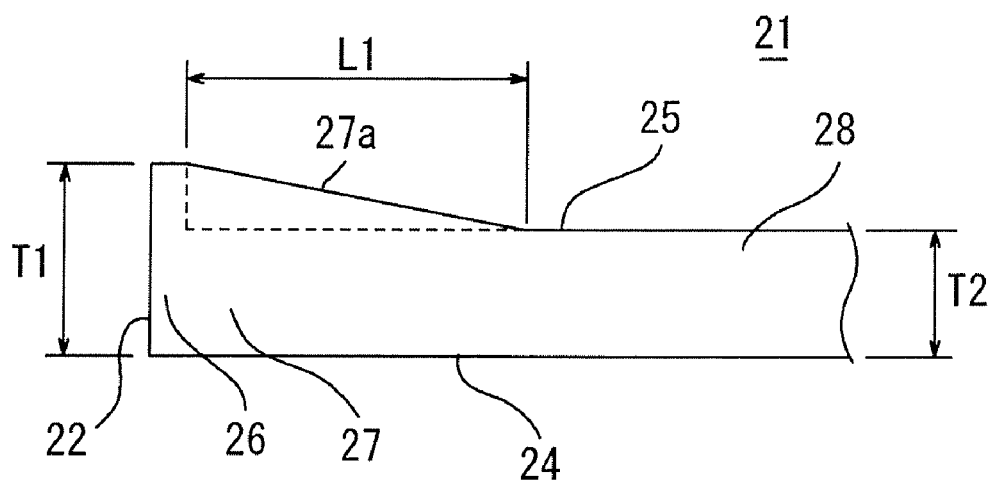
FIG. 4 is a schematic side view of the light guide plate, explaining dimensions thereof.

Referring to FIG. 4, the slope portion 27 is structured such that the aforementioned slope surface 27a comes closer to the light reflecting surface 24 with a constant gradient from the light entrance portion 26 toward the light emitting portion 28 so as to communicate with the light emitting surface 25. The slope portion 27 has a length L1 (dimension measured along the forward direction; refer to FIG. 4) and a largest thickness (which corresponds to the thickness of the light entrance portion 26, or to the short-side dimension T1 of the light entrance end surface 22 and therefore the largest thickness of the slope portion 27 is hereinafter indicated also by reference symbol "T1") wherein the length L1 is about 1.78 times as large as the largest thickness T1. Thus, the light guide plate 21 is structured to satisfy a predetermined relationship defined between the length L1 and the largest thickness T1 in the slope portion 27. The relationship will be described in details later. In this connection, the length L1 of the slope portion 27 is defined as a dimension of a component of the slope surface 27a which is parallel to the light reflecting surface 24 wherein the dimension is taken along the forward direction. That is to say, the length L1 of the slope portion 27 is a forward direction dimension of the slope surface 27a projected on the light reflecting surface 24.

The light emitting portion 28 is a rectangular plate with a constant thickness and includes, at the light reflecting surface 24, a light path converting pattern constituted by, for example, a plurality of dots. With the light path converting pattern formed as described above, the direction of light traveling in the light emitting portion 28 can be converted prior to exiting from the light emitting surface 25. In this connection, a reflection sheet 51 is disposed over the light reflecting surface 24 of the light guide plate 21, whereby light leaking outside from the light reflecting surface 24 is reintroduced into the light guide plate 24. On the other hand, a light diffusing sheet 52 and a pair of prism sheets 53 and 54 are placed in layers in this order over the light emitting surface 25, whereby the directivity of light exiting from the light emitting surface 25 is controlled.

Referring to FIG. 2, four of the seat blocks 29, which are for fixedly receiving the FPC 31, include a flat top face (plane top 29a to be described later) and are disposed at the slope surface 27 and at a part of the light emitting surface 25 located close to the slope surface 27 at intervals from one another so as not to be present in the forward direction of three of the LEDs 11 (shown by dashed lines in the figure). The aforementioned plane top 29a of the seat blocks 29 is substantially flash with the upper surface 26a of the light entrance portion 26 and has a width decreasing in the forward direction in top plan view.

The protrusions 30, which function to fixedly receive the FPC 31 in association with the seat blocks 29, have a rectangular shape body, are formed to extend out from the light entrance end surface 22 in the rearward direction and arranged along the long side of the light entrance end surface 22 at the same intervals as the seat blocks 29 so that two adjacent protrusions 30 form a space for accommodating the LEDs 11. The protrusions 30 have an upper face 30a disposed substantially flash with the upper surface 26a of the light entrance portion 26 and also with the plane top 29a of the seat block 29. In the case when the FPC 30 makes contact with only partial areas of the upper faces 26a, the plane tops 29a and the upper faces 30a of the light entrance portion 26, the seat blocks 29 and the protrusions 30, respectively, then the upper faces 26a, the plane tops 29a and the upper faces 30a may be provided with recesses formed to correspond to the contact areas so as to accommodate adhesive (double stick tape).

Referring to FIG. 3A, the FPC 30 has a strip shape and has long sides 31b and 31c (rearward and forward) having a dimension substantially equal to the long-side dimension of the light entrance end surface 22 of the light guide plate 21. On a mount surface 31a of the FPC 31, three of the LEDs 11 are mounted along the rearward long side 31b such that the light emitting face 12 is substantially orthogonal to the mount surface 31a and substantially parallel to the long sides 31b and 31c.

The FPC 31 having the LEDs 11 mounted thereon is aligned in position with the light guide plate 21 such that the light emitting face 12 of the LED 11 opposes a predetermined area of the light entrance end surface 22 positioned between two adjacent seat blocks 29 (two adjacent protrusions 30), and is adhesively attached to the light guide plate 21, wherein the plane tops 29a, and the upper faces 26a and 30a of the seat blocks 29, the light entrance portion 26 and the protrusions 30 make contact with the mount surface 31a of the FPC 31 (refer to hatched areas in FIG. 3B). When the FPC 31 is fixed to the light guide plate 21 as described above, the LEDs 11 are set in place with the light guide plate 21. It may be arranged such that the FPC 31 makes contact with only partial areas of the upper surface 26a, the plane tops 29a and the upper faces 30a of the light entrance portion 26, the seat blocks 29 and the protrusions 30, rather than the entire area thereof, as described above.

A light absorbing member (black paint) 32, which absorbs light leaking from the light guide plate 21 (slope portion 27), is provided at a part of the mount surface (surface facing the light guide plate 21) 31a located toward the forward long side 31c (forward direction of the LED 11). The light absorbing member 32 has a strip shape, is disposed in alignment with the forward long side 31c of the FPC 31 and covers, when fixedly attached to the light guide plate 21, at least a part area of the slope surface 27a and an area of the light emitting surface 25 located near the slope surface 27 (in FIG. 3A, a portion indicated by a dashed line hatching is coated with the light absorbing member 32). There is no specific limitation on the plan view shape and size of the light absorbing member 32, but the light absorbing member 32 preferably has a forward direction dimension larger than the largest thickness T1 of the slope portion 27 and is disposed to cross over the boundary between the slope surface 27a and the light emitting surface 25.

A frame 41 is made of white resin, shaped like a picture frame in the present embodiment and houses the LEDs 11, the light guide plate 21 and other constituent members all together.

In the spread illuminating apparatus 10 structured as described above, light emitted from the LED 11 as a point light source is guided to the light emitting portion 28 through the light entrance portion 26 and the slope portion 21 of the light guide plate 21 and then emitted from the light emitting surface 25 at the light emitting portion 28 in a spread manner.

Figure 5A:
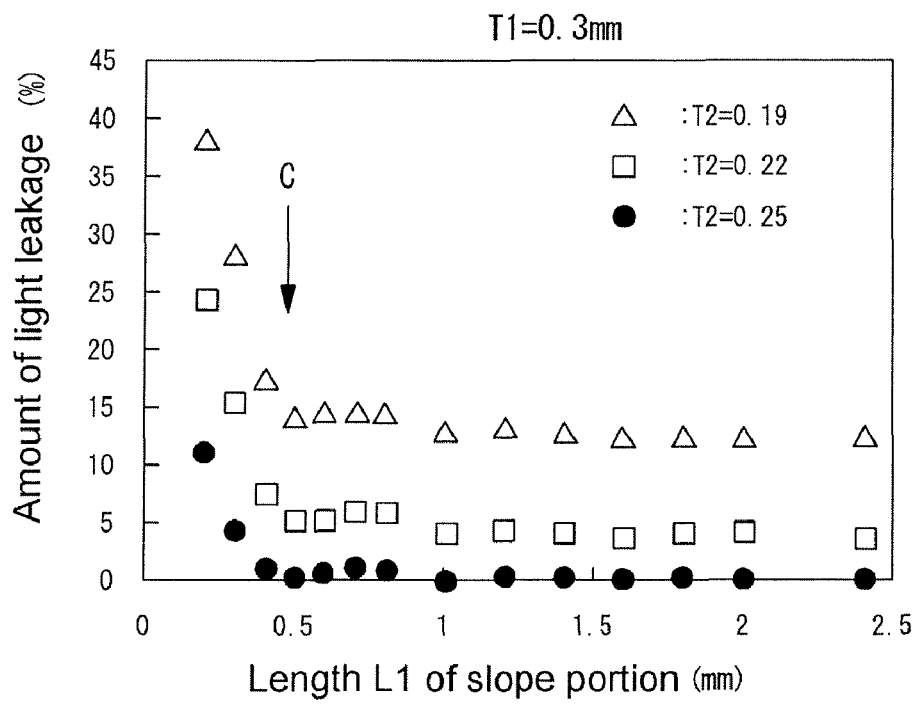
FIGS. 5A and 5B are graphs of concrete examples of relationships between a length of a slope portion of the light guide plate and light loss (amount of light leakage)
Figure 5B:
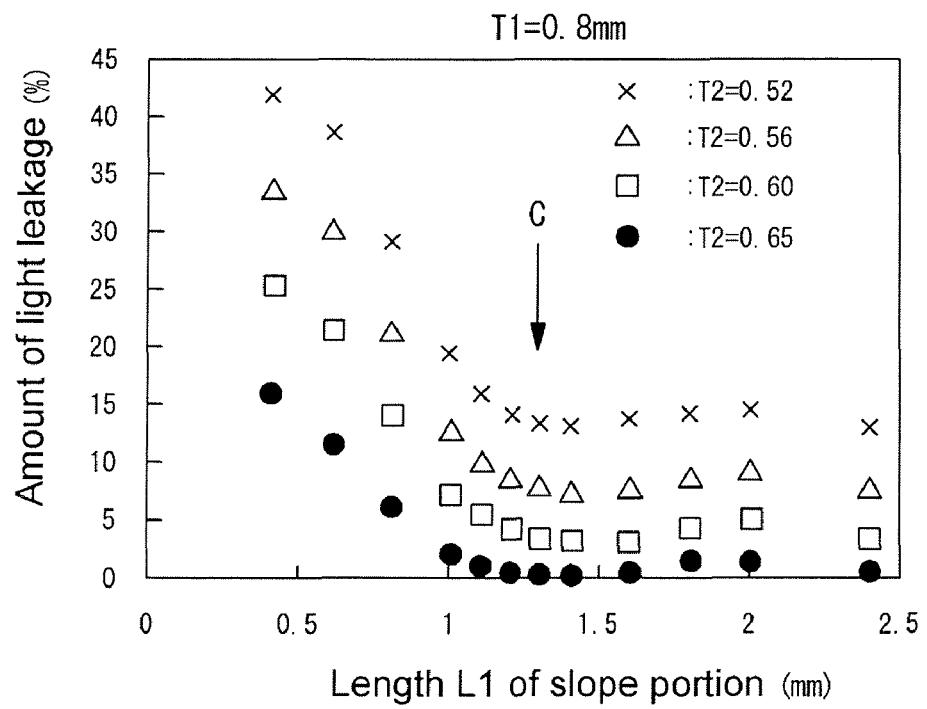
Figure 6:
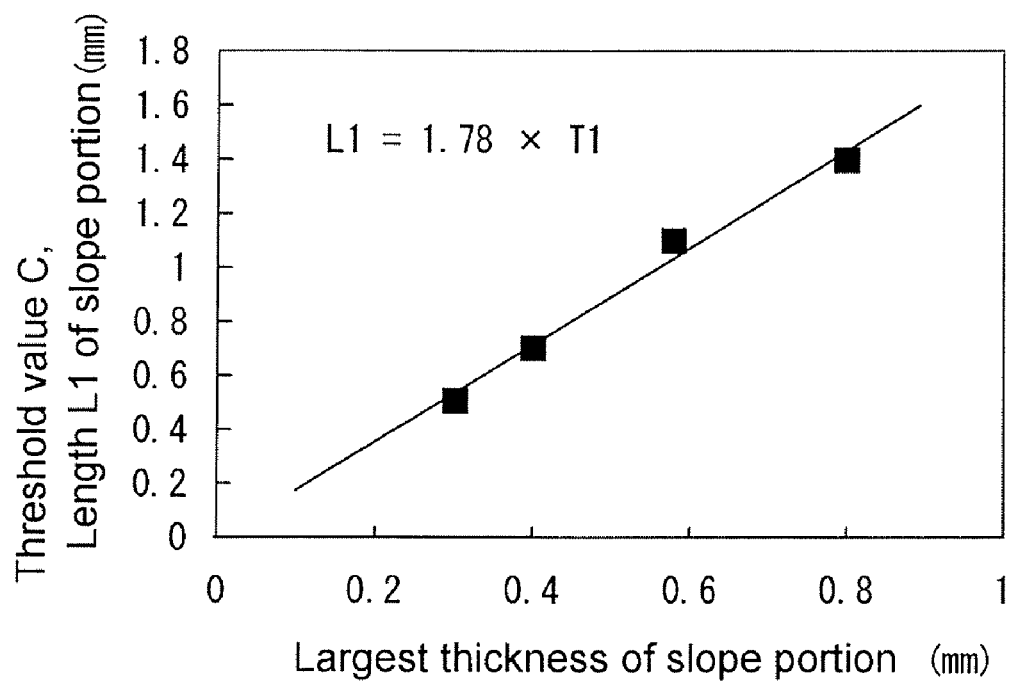
FIG. 6 is a graph of a relationship between a thickness of a light entrance end surface of the light guide plate (largest thickness of the slope portion) and a preferable length of the slope portion (threshold value)
Figure 7A:
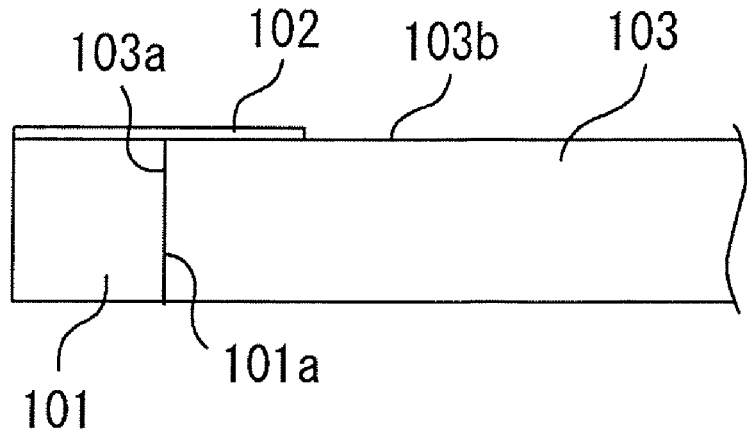
Figure 7B:
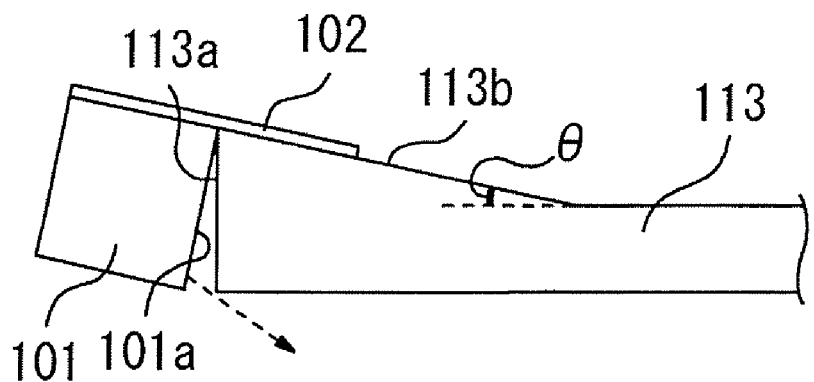

Description will now be specifically made of the earlier mentioned relationship between the length L1 and the largest thickness T1 in the slope portion 27 based on the data in FIGS. 5A, 5B and 6.

FIGS. 5A and 5B each show the amount of light leakage as a function of the length L1 of the slope portion 27, wherein analysis is made on how "the ratio of the amount of light leakage resulting from the slope surface 27a to the amount of light introduced into the light guide plate 21" depends on "the length L1 of the slope portion 27", where T2 refers to a smallest thickness of the slope portion 27 (the smallest thickness T2 is equivalent to the thickness of the light emitting portion 25; refer to FIG. 4) and is a variable number. FIG. 5A shows the analysis result of the case where the largest thickness T1 of the slope portion 27 is 0.3 mm, and FIG. 5B shows the analysis result of the case where the largest thickness T1 of the slope portion 27 is 0.8 mm. In both of the cases, when the length L1 of the slope portion 27 ranges below a certain value (hereinafter referred to as "threshold value C"), the amount of light leakage from the slope surface 27a starts increasing rapidly according to the decrease of the length L1 of the slope portion 27, and on the other hand, when the length L1 of the slope portion 27 ranges above the threshold value C, the amount of light leakage varies little regardless of the length L1 of the slope portion 27. Thus, when the length L1 of the slope portion 27 is set about the threshold value C, the light emitting area can be increased (non light emitting area can be reduced) without allowing light loss to increase.

Also, it is known that with a fixed value of the largest thickness T1 of the slope portion 27, the threshold value C stays substantially constant independent of the value of the smallest thickness T2 of the slope portion 27. When the threshold value C was calculated as a function of the largest thickness T1 of various example slope portions, it was found that the threshold value C has a linear relationship with the largest thickness T1 of the slope portion 27 as shown in FIG. 6. Specifically, the threshold value C (mm) is represented by a formula: threshold value C=1.78×the largest thickness T1 of the slope portion 27.

Based on the above finding, the light guide plate 21 of the spread illuminating apparatus 10 according to the embodiment of the present invention is structured to substantially satisfy the relationship of "the length L1 (mm) of the slope portion 27=1.78×the largest thickness T1 (mm) of the slope portion 27" wherein the length L1 of the slope portion 27 is set substantially to the threshold value C. In this connection, in consideration of the dependency of the light leakage upon the length L1 of the slope portion 27 as well as the degree of accuracy in manufacturing the light guide plate 21, the lower limit of the length L1 is determined by "(1.78$^-$0.5)×the largest thickness T1 of the slope portion 27", and the upper limit of the length L1 is determined by "(1.78×the largest thickness T1 of the slope portion 27)+0.5", preferably "(1.78×the largest thickness T1 of the slope portion 27)+0.2".

Advantageous effects of the spread illuminating apparatus 10 according to the embodiment of the present invention will be described.

In the spread illuminating apparatus 10, the light guide plate 21 is structured to substantially satisfy the relationship of "the length L1 of the slope portion 27=1.78×the largest thickness T1 of the slope portion 27", whereby, as clear from the explanation described above, the light illuminating area can be maximized while light loss attributable to the presence of the slope portion 27 is suppressed (that is to say, while the brightness and the brightness uniformity of illumination light are kept in an excellent condition). Also, since the length L1 of the slope portion 27 can be preferably determined by the largest thickness T1 of the slope portion 27 without depending on the thickness of the light emitting portion 28 of the light guide plate 21, the light guide plate 21 can be easily designed to satisfy various specifications, which is assumed to contribute to reducing the manufacturing cost.

Also, in the spread illuminating apparatus 10, the LED 11 is mounted on the FPC 31 such that the light emitting face 12 is substantially orthogonal to the mount surface 31a of the FPC 31, and the light guide plate 21 includes the seat blocks 29 which fixedly receive the FPC 31 and which are each formed such that the plane top 29a is substantially orthogonal to the light entrance end surface 22a of the light guide plate 21. Accordingly, when the FPC 31 is fixedly mounted on the plane tops 29a of the seat blocks 29, the light emitting face 12 of the LED 11 and the light entrance end surface 22 of the light guide plate 21 face each other in a substantially parallel manner, whereby light emitted from the light emitting face 22 of the LED 11 is allowed to be efficiently introduced into the light guide plate 21 without causing light leakage, and therefore the brightness of illumination light can be further increased. This advantageous effect can be achieved more effectively when the slope portion 27 has a large inclination angle (angle defined between the light emitting surface 25 and the slope surface 27a), as in the case of the present invention.

Further, the seat blocks 29 are situated at the slope surface 27a of the slope portion 27 except an area thereof located in the forward direction of the LEDs 11. So, when the FPC 31 is fixedly put in place on the seat blocks 29, there is a gap space between the mount surface 31a of the FPC 31 and the aforementioned area of the slope surface 27 located in the forward direction of each of the LEDs 11, whereby light traveling through the light guide plate 21 is inhibited from being absorbed by the FPC 31. Thus, the conventional problem of light absorption is suppressed and the brightness of illumination light can be increased.

Light emitted from the LED 11 is caused to spread out in the forward direction through the light guide plate 21 in a folding fan shape as shown by A in FIG. 3B. Therefore, the seat block 29 is formed to have, in top plan view, a width decreasing toward its distal end (in the forward direction) whereby the distance between adjacent two seat blocks 29 increases in the forward direction. With the above structure of the seat block 29, light absorption by the FPC 31 is reduced and at the same time the area of the plane top 29a is best increased thus enhancing the adhesion strength between the FPC 31 and the light guide plate 21.

Moreover, in the spread illuminating apparatus 10, the light absorbing member 32 is provided at the mount surface 31a of the FPC 31 so as to cover at least a partial area of the slope surface 27a of the slope portion 27 and an area of the light emitting surface 25 located near the slope surface 27a, whereby some light that may leak out from the slope surface 27a can be absorbed by the light absorbing member 32 thus further enhancing the brightness uniformity of illumination light.

While the present invention has been described with respect to a specific embodiment thereof, it is to be understood that the present invention is by no means limited thereto and may include various changes and combinations without departing from the sprit and scope of the present invention.

For example, in the embodiment described above, it is arranged such that the guide plate 21, toward its light entrance end surface 22, is provided with both the seat blocks 29 and the protrusions 30, but present invention is not limited to such an arrangement. If the advantageous effect resulting from the arrangement is not particularly taken into consideration, then either the seat blocks 29 or the protrusions 30 may be omitted, or both of the seat blocks 29 and the protrusions 30 may be omitted.

Also, in the embodiment described above, the light absorbing member 32 provided at the FPC 31 is disposed to face the slope surface 27a and the light emitting surface 25 of the light guide plate 21, but the present invention is not limited to such an arrangement. When a top priority is placed on the brightness uniformity of illumination light, it is preferable to provide the light absorbing member 32 as in the embodiment, but in the case if preference is given to the brightness of illumination light over the brightness uniformity of light illumination, a light reflecting material may be used in place of the light absorbing member. And, the light absorbing member does not necessarily have to be provided at the FPC 31 but may alternatively be applied, for example, to a film having diffusivity.

Also, the FPC 31 is disposed toward the light emitting surface 25 of the light guide plate 21 in the embodiment described above but may alternatively be disposed toward the light reflecting surface 24 of the light guide plate 24 in which case the seat blocks 29 are not required.

Further, in the embodiment described above, the seat blocks 29 are formed such that the distal end thereof covers an area of the light emitting surface 25 located near the slope surface 27a, but the present invention is not limited to such a configuration of the seat blocks 29. The seat blocks 29 may alternatively be formed such that the distal end thereof covers only the slope surface 27a without reaching the light emitting surface 25.

Moreover, in the embodiment described above, the slope surface 27a of the slop portion 27 has a constant gradient, but the present invention is not limited to such a slope distribution, and alternatively the gradient may vary continuously in the forward direction.

What is claimed is:

1. A spread illuminating apparatus comprising:
   a light source; and
   a light guide plate comprising: a light entrance end surface at which the light source is disposed; a light emitting portion from which light emitted from the light source and introduced into the light guide plate exits out in a spread manner; and a slope portion which is disposed between the light entrance end surface and the light emitting portion and which has a thickness decreasing toward the light emitting portion, wherein a length of the slope portion is substantially 1.78 times as large as a largest thickness of the slope portion.

2. A spread illuminating apparatus according to claim 1, wherein the light source is a point light source and is mounted on a flexible printed circuit board, and wherein the light guide plate further comprises a seat block which is disposed at the slope portion except an area of the slope portion located in a light progression direction of the light source, and on which the flexible printed circuit board is disposed.

3. A spread illuminating apparatus according to claim 2, wherein a light absorbing member is disposed at a surface of the flexible printed circuit board facing the light guide plate.

4. A spread illuminating apparatus comprising:
   a point light source mounted on a flexible printed circuit board; and
   a light guide plate comprising: a light entrance end surface at which the point light source is disposed; a light emitting portion from which light emitted from the light source and introduced into the light guide plate exits out in a spread manner; and a slope portion which is disposed between the light entrance end surface and the light emitting portion and which has a thickness decreasing toward the light emitting portion; and a seat block which is disposed at the slope portion except an area of the slope portion located in a light progression direction of the light source, and on which the flexible printed circuit board is disposed.

5. A spread illuminating apparatus according to claim 4, wherein the point light source comprises a first face attached to the flexible printed circuit board and a second face which is substantially orthogonal to the first face and from which the light from the light source exits out, and wherein the seat block comprises a plane top which is substantially orthogonal to the light entrance end surface and on which the flexible printed circuit board is disposed.

6. A spread illuminating apparatus according to claim 4, wherein a light absorbing member is disposed at a surface of the flexible printed circuit board facing the light guide plate.

7. A spread illuminating apparatus according to claim 2, wherein the light source comprises a first face attached to the flexible printed circuit board and a second face which is substantially orthogonal to the first face and from which light is emitted, and wherein the seat block comprises a plane top substantially orthogonal to the light entrance end surface.

8. A spread illuminating apparatus according to claim 2, wherein the seat block has a width decreasing in forward direction in a top plan view.

9. A spread illuminating apparatus according to claim 4, wherein the seat block has a width decreasing in forward direction in a top plan view.

* * * * *